Nov. 12, 1929.                H. I. MORRIS                1,735,351
           APPARATUS FOR AND PROCESS OF MAKING TIRE CASINGS
                         Filed Oct. 5, 1923          7 Sheets-Sheet 1
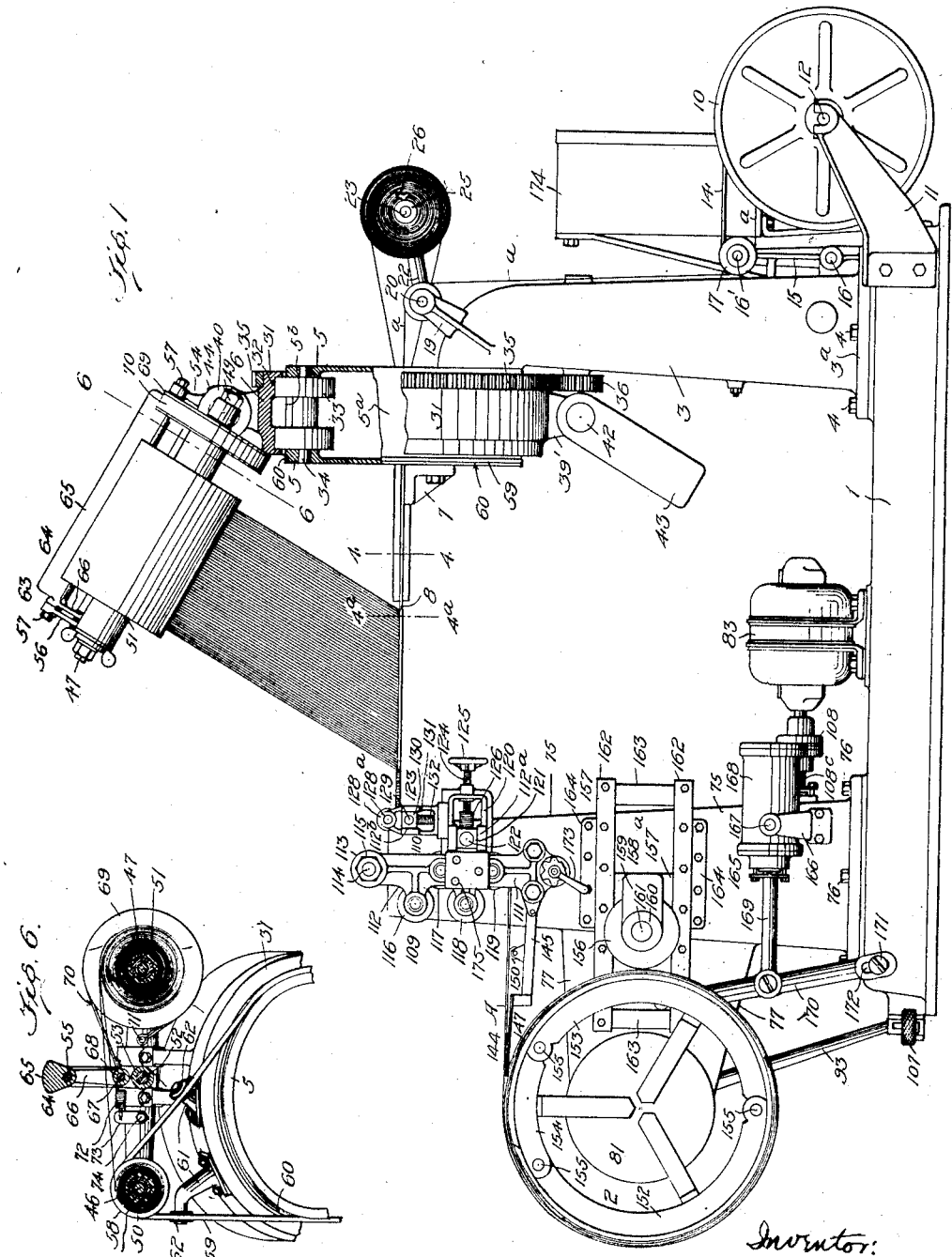
Inventor:
Howard I. Morris
By ... Pitts
   atty Nov. 12, 1929.  H. I. MORRIS  1,735,351
APPARATUS FOR AND PROCESS OF MAKING TIRE CASINGS
Filed Oct. 5, 1923   7 Sheets-Sheet 2
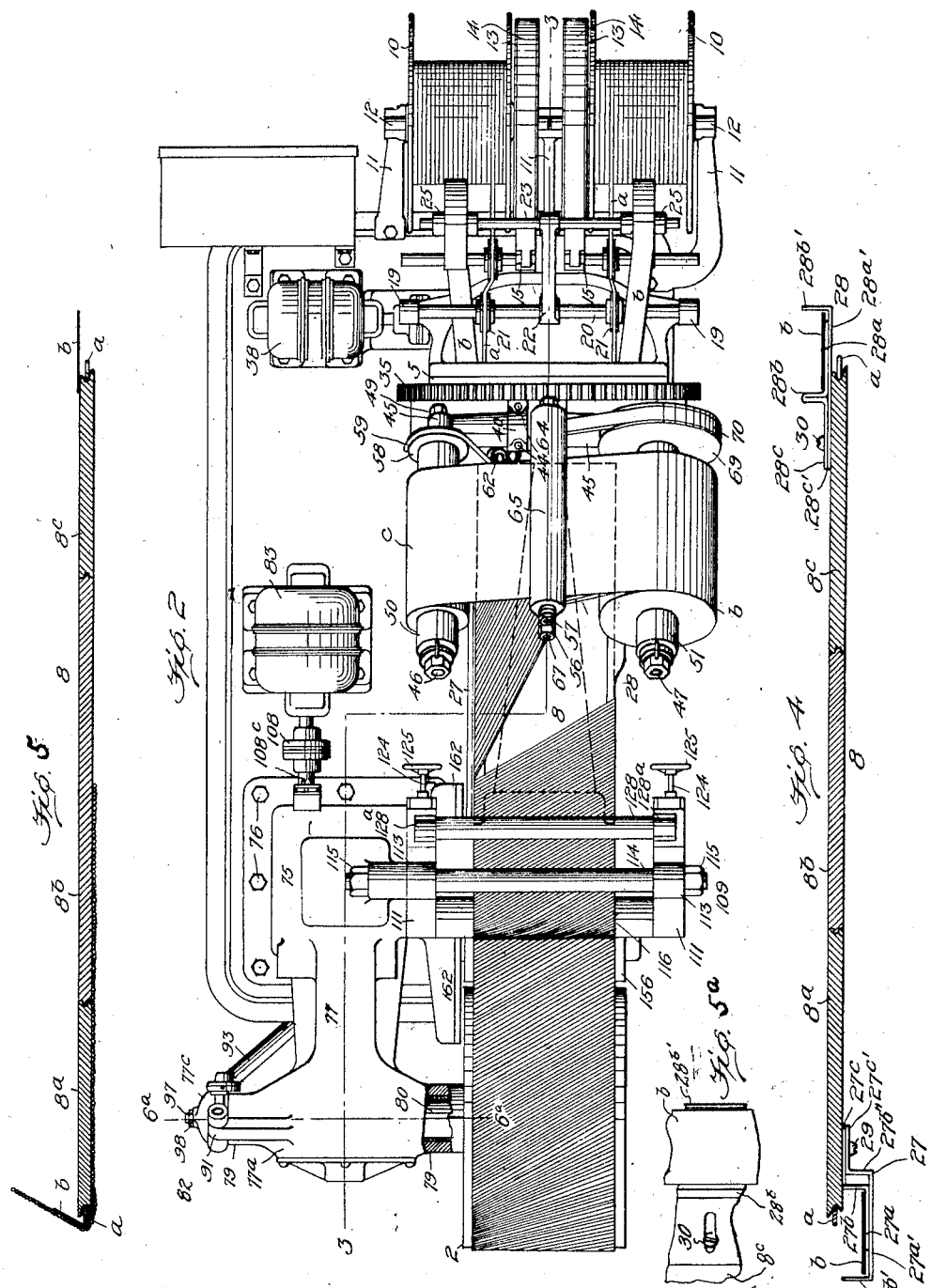

Nov. 12, 1929.  H. I. MORRIS  1,735,351
APPARATUS FOR AND PROCESS OF MAKING TIRE CASINGS
Filed Oct. 5, 1923  7 Sheets-Sheet 3
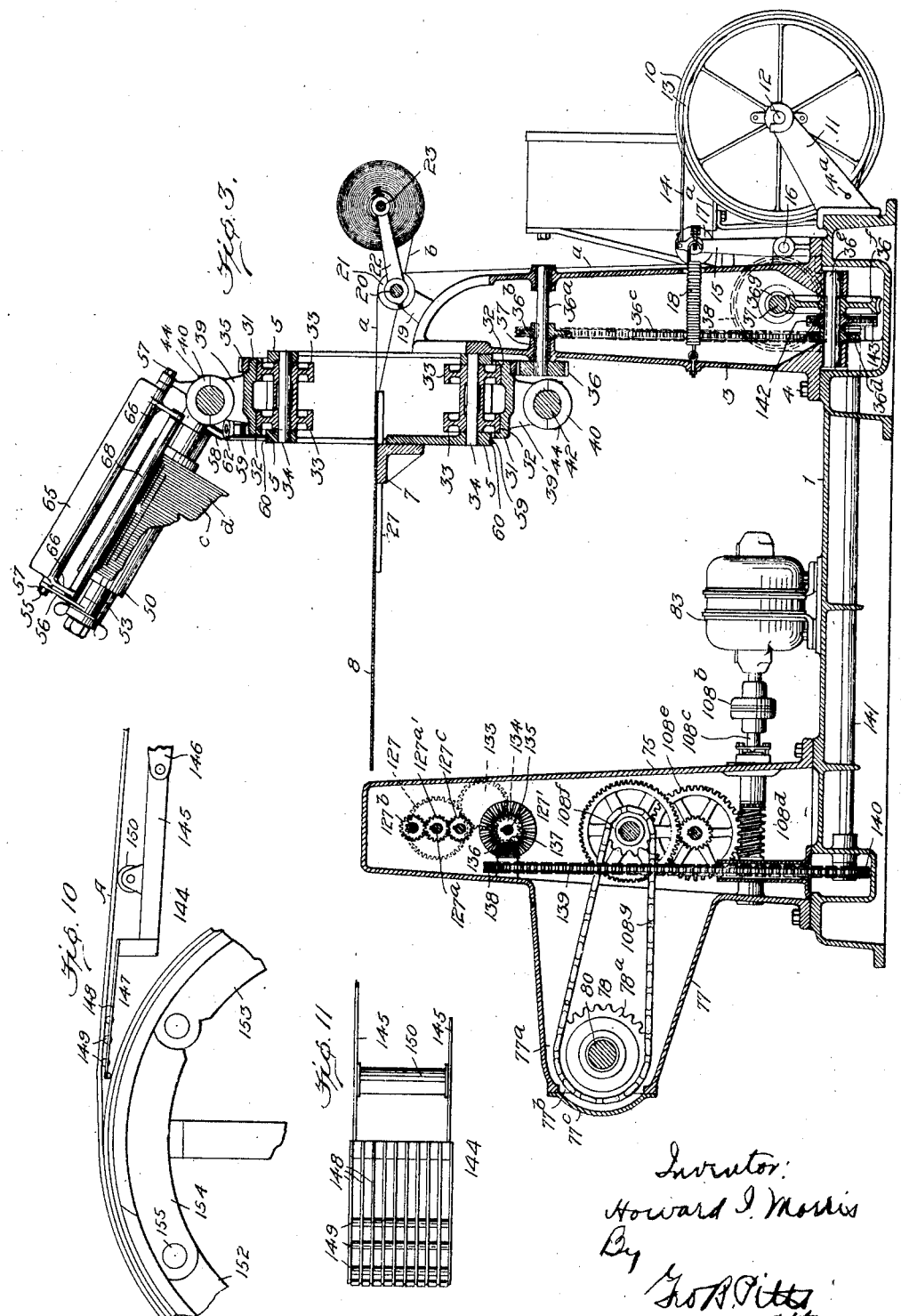

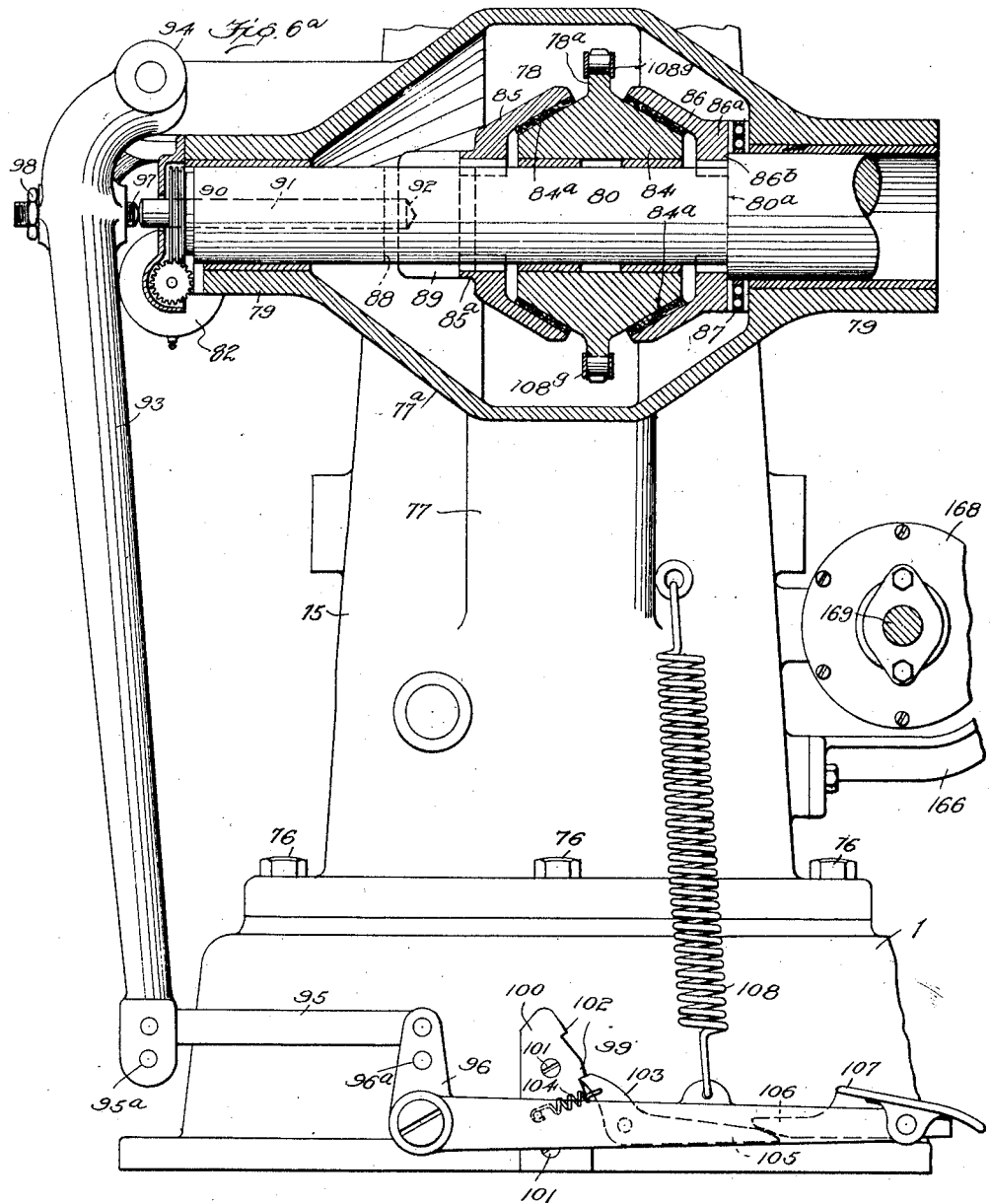

Nov. 12, 1929.  H. I. MORRIS  1,735,351
APPARATUS FOR AND PROCESS OF MAKING TIRE CASINGS
Filed Oct. 5, 1923  7 Sheets-Sheet 5
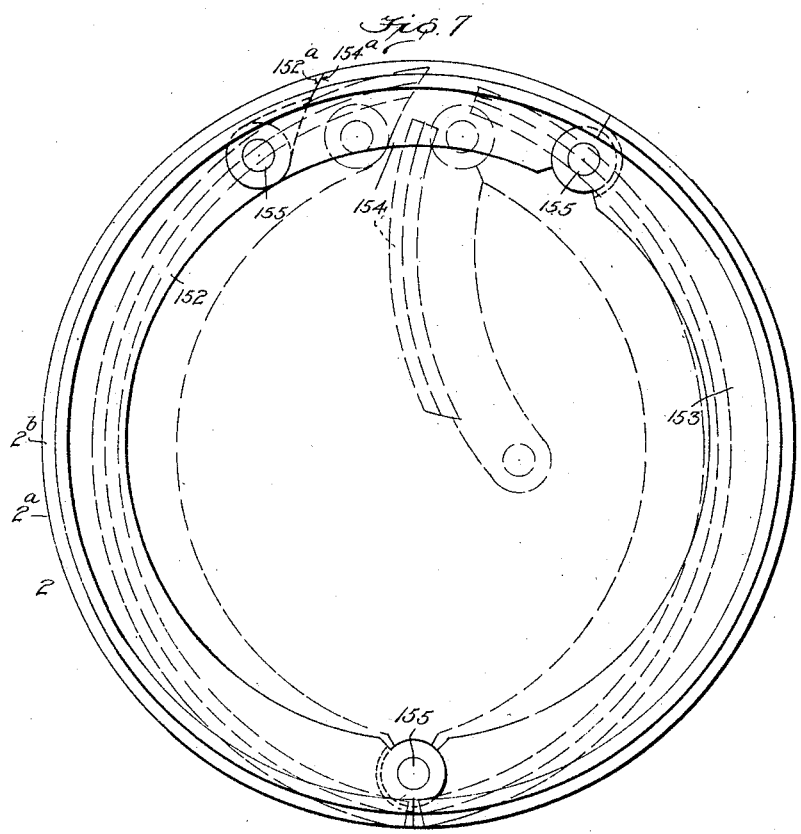
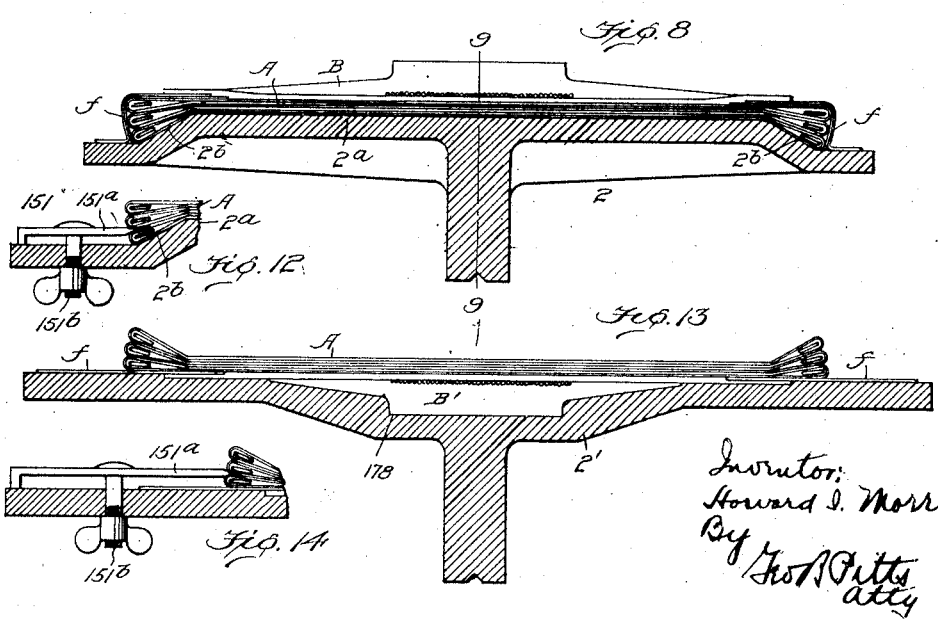

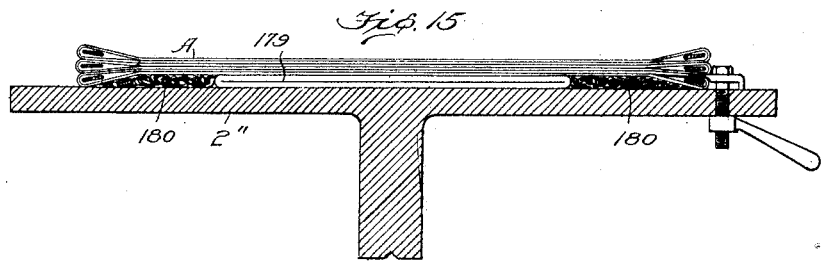
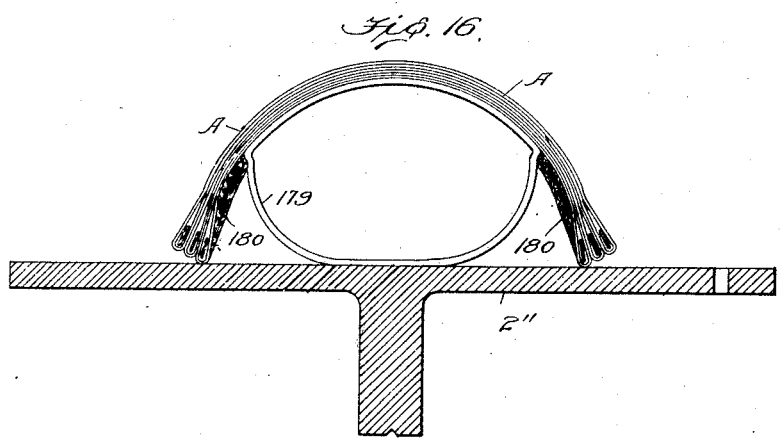
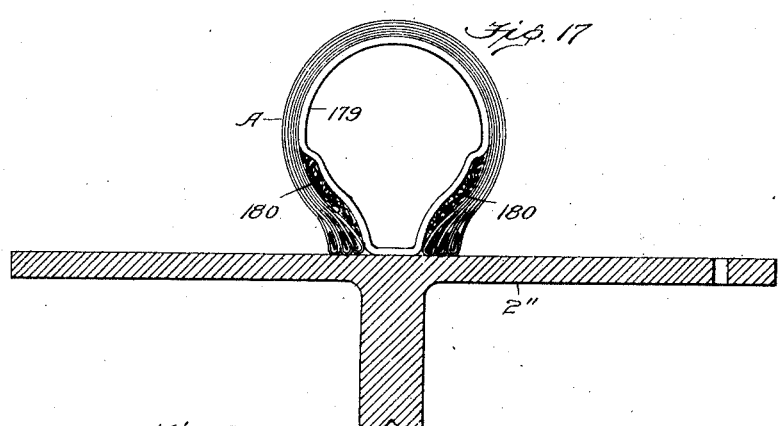
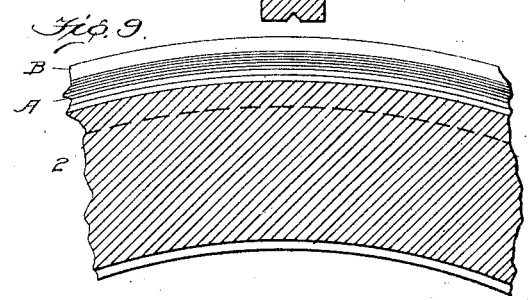

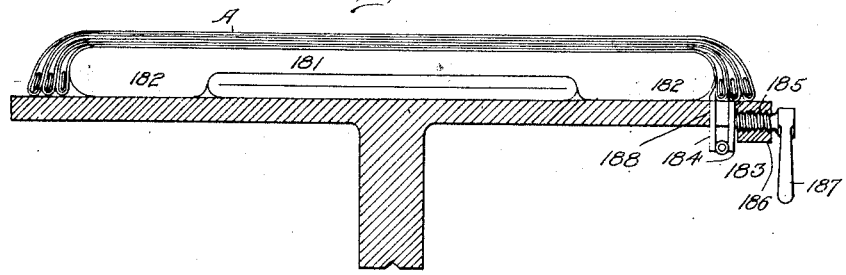
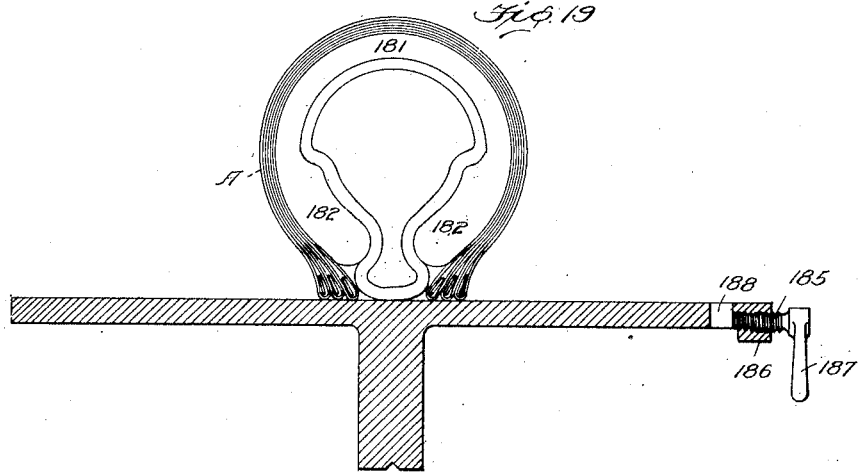
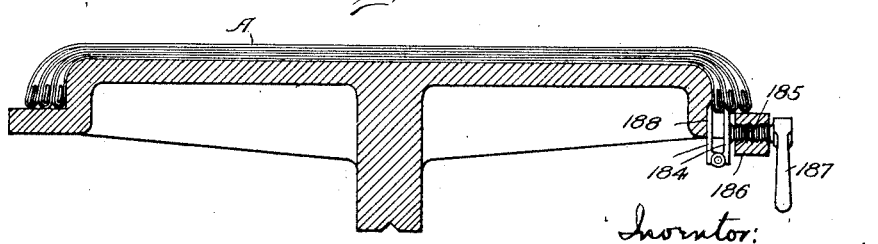

Patented Nov. 12, 1929

1,735,351

UNITED STATES PATENT OFFICE

HOWARD I. MORRIS, OF CLEVELAND, OHIO, ASSIGNOR TO THE CORD TIRE MACHINE COMPANY, OF CLEVELAND, OHIO, A CORPORATION OF ARIZONA

APPARATUS FOR AND PROCESS OF MAKING TIRE CASINGS

Application filed October 5, 1923. Serial No. 666,720.

This invention relates to an apparatus for and process of making tires or tire casings.

One object of the invention is to provide an improved machine adapted to fabricate the materials, of which the casing is to be made, and to wind such materials in a rapid and economical manner.

Another object of the invention is to construct a machine of this character of relatively few parts, whereby its manufacture and assembly is relatively cheap and simple and its operation simplified.

Another object of the invention is to construct an improved carcass material fabricating machine, wherein provision is made for making a composite web, of which the carcass is formed, of any desired width.

Another object of the invention is to provide a relatively simple machine for forming tire materials into a complete tire carcass in flat condition, ready for the expanding operation to shape it for actual use.

Another object of the invention is to construct a machine of novel form in which a tire carcass may be built in concentric relation to a deflated tube so that upon the completion of the carcass, it may be readily and easily expanded into the desired shape.

Another object of the invention is to provide an improved machine for making tire casings in which the walls of the latter are wound upon the rubber material which will later constitute the tread and side walls of the tire casing to the end that the casing may be easily and rapidly made.

Another object of the invention is to provide an improved process of making tire carcasses, whereby they may be constructed rapidly and economically.

Another object of the invention is to provide an improved process of making tire casings in which the carcass is built upon the material which constitutes the tread of the tire, whereby casings may be readily made complete prior to the shaping or expanding of the materials into their final cross sectional shape.

Other objects of the invention will be apparent to those skilled in the art to which my invention relates from the following description taken in connection with the accompanying drawings.

Fig. 1 is a side view of a machine, embodying my invention, for fabricating a composite web of material and winding the web on a drum.

Fig. 2 is a top plan view of the machine.

Fig. 3 is a section on the line 3—3 of Fig. 2.

Fig. 4 is a section on the line 4—4 of Fig. 1, enlarged.

Fig. 5 is a section on the line 4ª—4ª of Fig. 1.

Fig. 5ª is a fragmentary view of parts shown in Fig. 4.

Fig. 6 is a section on the line 6—6 of Fig. 1.

Fig. 6ª is a fragmentary view, enlarged, partly in section on the line 6ª—6ª of Fig. 2.

Fig. 7 is a side view of the drum.

Fig. 8 is a fragmentary transverse sectional view of the drum and tire casing after the latter is wound thereon.

Fig. 9 is a section on the line 9—9 of Fig. 8.

Fig. 10 is a fragmentary side view, enlarged, showing the guide for the web.

Fig. 11 is a plan view of the guide.

Fig. 12 is a fragmentary sectional view showing the device for clamping the web to the drum.

Fig. 13 is a section similar to Fig. 8, but showing a modified form of drum on which the casing is made in an inverted position.

Fig. 14 is a fragmentary view showing the clamp used in connecting the web to the drum shown in Fig. 13.

Fig. 15 is a view similar to Fig. 8, but showing another modified form of construction wherein the casing is wound in superposed relation to a deflated tube.

Fig. 16 is a view similar to Fig. 15, but showing the tube partially inflated.

Fig. 17 is a view similar to Fig. 16, but showing the tube completely inflated and the casing in its final shape.

Fig. 18 is a section similar to Fig. 8, but showing a further modified form of construction.

Fig. 19 is a sectional view similar to Fig. 18, but showing the casing shaped to final form.

Fig. 20 is a section similar to Fig. 8, but showing a still further modified form on construction.

In the drawings, 1 indicates a base of any desired shape, but preferably of substantially L shape to mount certain mechanisms of the machine in alignment with a drum 2, on which each tire casing is wound, this construction of base utilizing a minimum amount of metal in casting it and facilitating access to various parts of the machine.

3 indicates a standard, preferably comprising a hollow casting, having around its lower end flanges $3^a$, which are secured to the lateral portion of the L base in any desired manner, for example, by bolts 4. At its upper end the standard 3 supports a ring 5, which forms a bearing for a shuttle indicated as an entirety at 6. 7 indicates a bracket fixed in any well known way to the front edges of the ring 5, and supporting a horizontal platen 8, which guides or supports the various materials as they are being associated for fabrication into a composite web A. A bracket 7 is arranged to support the platen 8, in a horizontal plane substantially cutting the axis of the shuttle 6, to insure uniform application of the materials delivered by the shuttle 6 and their association with those materials that are fed endwise of the platen in the manner to be later set forth.

The opposite side edges of the platen are formed with grooves 9, which form guides for beads or bead strands $a$. Each bead strand preferably comprises a relatively narrow flat band formed of woven wire, wound on a drum or spool 10, from which it is supplied in the manner to be set forth. Each bead may consist of a single strand of wire or other material, or a plurality of wires or other material, twisted or otherwise fabricated into a strand that may be substantially round in cross section. 11 indicates a plurality of brackets preferably secured to and extending rearwardly of the base 1. The outer ends of the brackets 11 are provided with bearings which removably receive the opposite ends of a pair of shafts 12. As shown in Fig. 2, there are three brackets 11 and they are spaced so that the center bracket supports the adjoining ends of the shafts 12. The shafts 12 carry the spools 10. 13, 13, indicate brake wheels, each having fixed relation to one of the spools 10. 14, 14, indicate bands, each engaging one of the wheels 13, so as to retard the rotation of the spool 10, to prevent paying out of the bead strand too rapidly. Each band is fixed at one end in any suitable manner to the base 1, preferably to a pin $14^a$. The other end of the band is fixed to the free end of a lever 15, fulcrumed at 16. The lever 15 is provided with a shaft $16'$, which carries a guide wheel or sheave 17 around which the bead strand $a$ runs as it is supplied from the adjacent spool 10. 18 indicates a spring connected at one end to the standard 3. The other end of the spring is connected to the lever 15 and normally operates to wind the band 14 on the adjacent wheel 13 to brake the latter. As the bead strip or strand $a$ runs around the sheave 17, it will be seen that the pull on the strand will tend to release the brake and thus permit the spool to pay out the strand; and as the pull decreases due to the increased paying out of the strand, the pull of the latter against the tension of the spring will decrease and thus permit the spring to act on the band. As a result of these operations the supply of the bead strand will be automatically controlled. 19 indicates a pair of arms projecting upwardly from the upper end of the standard 3. The outer ends of the arms 19 are provided with openings to removably receive and support the opposite ends of a rod 20. The rod 20 forms a shaft for a pair of guide sheaves 21, over which the bead strands $a$ run to guide them thru the ring 5 and shuttle 6 to the grooves 9. The sheaves 17 preferably slide endwise on the shaft 16 in order to accommodate themselves to the convolutions of the strands $a$ as they unwind from the spools 10.

22 indicates a bracket fixed in any desired manner to the rod 20 and supporting at its outer end a shaft 23. The shaft 23 extends laterally in opposite directions from the bracket and supports drums or arbors 24 on which are convolutely wound the strips of material $b$ in which the bead strands $a$ are embedded in the fabricated web A.

The strips $b$ are preferably formed of rubber suitably compounded to become hard when cured. The shaft 23 is arranged to support the arbors in position so that the strips $b$ will be guided thru the ring 5 to the platen 8 in alignment with the bead strands $a$. The arbors 24 preferably loosely rotate on the shaft 23, being held against endwise movement thereon by pairs of collars 25, each fixed to the shaft by a set screw 26.

27, 28, indicate guides for the embedding strips $b$ carried by the platen 8 and arranged to support the strips in proper relationship to the strands $a$ so that the strips $b$ may be folded over or around the strands $a$, to embed them, in the manner to be later set forth. The guides 27, 28, are connected to the upper and lower surfaces of the platen and extend beyond the opposite side edges of the latter, as shown in Fig. 3, for a purpose which will later appear. Each guide consists of a horizontal portion and side walls, being preferably so constructed that the width of the horizontal portion may be varied to accommodate strips of different widths as desired. For this purpose, the guide 27 comprises a main plate having a bottom section $27^a$ a side section $27^b$ and foot $27^c$, and a secondary plate having a bottom section $27^{a\prime}$ of greater length than the bottom section $27^a$, outer and inner side sections 27$^{b'}$, 27$^{b''}$ and a foot 27$^{c'}$. The feet 27$^c$, 27$^{c'}$, are formed with elongated slots, each slot in one foot registering with a slot in the other foot so that set screws 29 may extend thru registering slots and engage the platen to secure the plates thereto. The elongated slots permit (1) the plates to be adjusted laterally so that approximately one-half of the strip $b$ will lie beyond the free edge of the adjoining bead strand $a$ and (2) the secondary plate to be adjusted relative to the main plate to adjust the width of the guide. The guide 28 comprises a main plate having bottom section 28$^a$, a side section 28$^b$ formed by crimping the metal on longitudinal lines to provide an up-standing wall and a foot 28$^c$, and a secondary plate having a bottom section 28$^{a'}$ and a side section 28$^{b'}$, co-operating with the wall or side section 28$^b$ to form the outer and inner side walls for the guide and a foot 28$^{c'}$. The feet 28$^c$, 28$^{c'}$, are formed with elongated slots, each slot in one plate being adapted to register with a slot in the other plate so that screws 30 may extend thru the slots and engage the platen 8 to secure the plates thereto. The elongated slots permit the plates to be adjusted laterally relative to the platen and also relative to each other for reasons similar to those already described in connection with the plates comprising the guide 27. The platen 8 is preferably so constructed that it may be made wider or narrower, as desired, to form webs of the desired width. For this purpose I construct the platen of three longitudinal sections 8$^a$, 8$^b$, 8$^c$, the center one (8$^b$) of which has side edges that converge toward one end of the section and the abutting edges of the outer sections 8$^a$, 8$^c$, are similarly shaped, so that the endwise movement of the center section relative to the side section 8$^a$, 8$^c$, will operate to position the latter farther apart or nearer together accordingly as the center section 8$^b$ is moved in one direction or the other. The abutting edges of the sections 8$^a$, 8$^b$, and 8$^c$, are formed with tongues and grooves (see Figs. 3 and 4) to insure the guiding and supporting of the center section. The means for securing the inner ends of the side sections 8$^a$, 8$^c$, to the bracket 7 is of a character to permit their adjustment toward and from each other. The opposite side edges of the center 8$^b$ are preferably tapered toward its rear end, so that when the section is moved to its extreme inward position, as shown in Fig. 2, the side sections 8$^a$, 8$^c$, will be spaced their greatest distance apart to form a web of the maximum width. Accordingly, by moving the center section 8$^b$ endwise outwardly, the side sections 8$^a$, 8$^c$, may be adjusted toward each other to arrange their outer side edges at the desired spaced distance to form the web of the width determined upon.

Of the shuttle 6, 31 indicates a ring member rotatably mounted on the ring 5. The ring member 31 is provided with spaced tracks 32 on its inner wall which engage sets of rollers or wheels 33 loosely mounted on shafts 34, each supported at their opposite ends in the side walls of the ring 5. The outer or peripheral wall 5$^a$ of the ring 5 is formed with openings 5$^b$ (one being shown in Fig. 1) thru which the sets of rollers 33 extend for engagement with the tracks 32. 35 indicates a ring gear, fixed to the ring member 31 in any desired manner, and meshing with a pinion 36. The pinion 36 is fixed to a shaft 36$^a$, mounted in bearings, supported in the bosses 37 provided on the standard 3. The shaft 36$^a$ is driven by any suitable gearing, preferably mounted in the standard 3, that shown comprising a sprocket wheel 36$^b$, a sprocket chain 36$^c$ running over the wheel 36$^b$ and a sprocket 36$^d$ fixed to a shaft 36$^e$, a worm gear 36$^f$ carried by the shaft 36$^e$ and a worm 36$^g$ fixed to a shaft 37, driven by a motor 38, preferably of the electric type. 39, 39', indicate pairs of spaced lugs preferably integrally formed on the outer surface of the ring member 31 at diametrically opposite sides thereof, the ends of the lugs cooperating with caps 40 to form bearings, one bearing forming a support for a frame 41 about to be described and the other bearing forming a support for a shaft 42 carrying a weight 43, which counterbalances the frame 41 and parts carried thereby. The caps 40 are held in position by suitable cap screws 44, which, when tightened, hold the frame 41 and shaft 42 at the desired positions with the weight 43 at any determined angle relative to the axis of the shuttle ring member 31. The frame 41 comprises a cross bar 45 having transverse openings formed in opposite ends to receive the corresponding ends of shafts 46, 47, the ends of these shafts being threaded to receive nuts 49, by which they are secured in the openings and in fixed relation to the bar 45. The shafts 46, 47, are adapted to rotatably support spools 50, 51, respectively, to be later referred to. Intermediate the ends of the cross bar 45 is a boss (not shown), preferably disposed between the lugs 39. The boss is hollowed out to form a bearing for one end of a shaft 52, carrying a guide roller 53 to which reference will later be made. 54 indicates a bracket or arm, preferably formed integrally with the bar 45, and formed with an opening to receive one end of a rod 55. The opposite end of the rod 55 carries a supporting member 56, in which is formed an opening aligned with the opening in the boss just referred to and forming the bearing for the outer end of the shaft 52. The ends of the rod 55 are screw threaded to receive nuts 57, by means of which the rod is secured to the arm 54 and the supporting member 56 is secured to the rod. To support the supporting member in spaced relation to the arm 54, the rod 55 is reduced near its opposite ends to form shoulders, which bear against the inner faces of the arm 54 and member 56. The spool 51 is adapted to support the web of tire material which is supplied by the shuttle to and associated with the bead strands $a$ and embedding strips $b$, being unwound from the spool 51 as the shuttle rotates, such material comprising a plurality of cords $c$ arranged substantially parallel to each other, or, by preference, a plurality of parallel arranged cords $c$ embedded in sheet rubber $d$; whereas the spool 50 is adapted to have wound on it the liner material $e$, (which is wound in with the sheet rubber $d$ and cords $c$ for well known reasons), for which purpose the inner end of the spool 50 is provided with a grooved pulley 58, so that a band or belt 59, engaging a groove 60, in the ring 5, may rotate the spool 50, as the ring member rotates, and thus cause the liner material $e$ to wind thereon. 61, 61, indicate arms secured to the ring member 31 and provided with suitable stud shafts on which guide rollers 62 are mounted to guide the band 59 into alignment with the pulley 58 and groove 60.

63 indicates as an entirety an automatic mechanism for controlling the paying out or supply of the web of cords or web of cords and sheet rubber so that the tension on the web will be substantially uniform at all times. Of this mechanism, 64 indicates a frame swingably mounted on the rod 55 between the arm 54 and supporting member 56. The frame 64 preferably comprises a sleeve 65, depending arms 66, connected by a rod 67, loosely supporting a roller 68 to which reference will later be made. The upper wall of the sleeve 65 is preferably thickened to provide a counterbalance to off-set gravity on the frame 64 as it rotates with the shuttle frame 41. 69 indicates a brake wheel fixed to the inner end of the spool 51. 70 indicates a brake band wrapped around a portion of the wheel, one end of the brake band being fixed to a stud 71 projecting laterally from the inner side of the cross bar 45 and its opposite end being secured to the adjacent free end of the frame 64. 72 indicates a spring having one end fixed to the frame 41, preferably to a plate 73 fixed thereto by a bolt 74 and its other end connected to the frame 64 and normally tending to swing it in one direction about the rod 55. As shown in Fig. 6, the spring is disposed on that side of the frame 64 remote from the spool 51 and acts to swing the free end of the frame away therefrom, and as the brake band 70 is connected to the frame 64, such action will result in applying the brake to the wheel 69. A wound web of tire materials $c$, $d$, is placed on the spool 51, as shown in Fig. 6, and its end is led over and around the roller 68 and then over and around the guide roller 53, from which the web leads to the platen for association with the strands $a$ and strips $b$ and fabrication of the composite web A. As the web $c$, $d$, is drawn off of the spool 51, due to the revolving movement of the latter with the shuttle ring 5, the tension of the web running around the rollers 68, 53, will tend to expand the spring 72 and hence relieve the tension of the brake band 70 on the brake wheel 69, thereby permitting the latter to rotate to pay out the web; following the relieving of the brake band and the paying out of the web under the tension imparted thereby to the swinging frame 64, the tension of the web on the latter will be decreased, the effect of which will be to permit the spring 72 to act on the frame 64 and thru it on the brake band 70 to wrap it about the brake wheel 69 and thereby stop the free rotation of the latter and undue paying out of the web. It will be understood that the parts just referred to are arranged to co-act so that the braking and releasing of the brake wheel incident to the increase and decrease of the tension of the web running around the roller 68 will result in controlling the rotation of the spool 51 to the end that the paying out of the web therefrom and the tension thereon at all times is substantially uniform. As a result of this arrangement and operation, the web is delivered to the platen uniformly and wound thereon and the spaced bead strands $a$ and strips $b$ unite smoothly as the materials become associated.

75 indicates a column disposed at that end of the base 1 remote from the standard 3 and flanged around its lower end to facilitate its assembly on the base by screws or bolts 76, the column 75 and a rearwardly extending arm 77 preferably comprising a hollow casting. The outer portion of the arm is shaped to form a housing $77^a$ for a friction clutch mechanism, indicated as an entirety at 78 and bearings 79 for the driven shaft 80 to which the chuck 81, for the drum 2, is connected. The housing $77^a$ is formed with an opening $77^b$, closed by a suitable cover $77^c$. 82 indicates as an entirety an automatic throw-out and stopping mechanism for stopping the motor 83, which drives the driven element $78^a$ of the friction clutch mechanism 78, but since this stopping mechanism will be claimed in another application to be co-pending herewith, the same is not claimed herein.

Referring to the friction clutch mechanism 78, the driven element $78^a$ thereof preferably comprises a sprocket wheel loosely fitting the chuck shaft 80 and capable of freely rotating and sliding endwise thereon. The hub portion 84 of the wheel $78^a$ is extended to either side and provided with conical side walls $84^a$ to constitute clutch members with which similarly shaped clutch elements 85, 86, engage. The side walls $84^a$ may be covered with suitable material to increase the friction between the wheel $78^a$ and clutch elements 85, 86. The hub 86ᵃ of the clutch element 86 is splined to the shaft 80 in any desired manner and is formed with a rabbeted portion 86ᵇ to fit against a shoulder 80ᵃ on the shaft 80. 87 indicates an anti-friction thrust bearing surrounding the shaft 80 and interposed between the end of the hub 86ᵃ and the end wall of the housing 77ᵃ and adapted to take the thrust of the shaft 80 due to the pressure exerted between the friction clutch members when operating to transmit the power of the wheel 78ᵃ to the shaft 80. The hub 85ᵃ of the clutch element 85 is splined to the shaft 80 in any desired manner so as to slide endwise thereon to effect frictional engagement between the clutch members in the manner about to be described. 88 indicates an opening formed in the shaft 80. The opening 88 extends longitudinally of the shaft 80 and diametrically thereof. 89 indicates a plate slidably fitting the opening 88 and movable endwise therein. As shown in Fig. 6ᵃ the inner edge of the plate 89 engages the end of the hub 85ᵃ to move the latter toward the right, as viewed in Fig. 6ᵃ, when operated by a thrust means indicated as an entirety at 90. When so operated, the clutch element 85 is pressed against the adjacent side wall 84ᵃ, which pressure in turn will slide the wheel 78ᵃ toward the right to effect frictional engagement between the other side wall 84ᵃ and the clutch element 86. As the latter element abuts the thrust bearing 87, the pressure set up by the movement of the plate endwise of the shaft 80 will effect frictional engagement between the clutch members to a greater or less extent and thereby effect a drive between the wheel 78ᵃ and shaft 80 with a greater or lesser amount of slip, dependent upon the pressure applied by the plate 89. Of the thrust means 90, 91 indicates a rod slidably fitting an opening leading inward from the outer end of the shaft 80 (the left end thereof as viewed in Fig. 6ᵃ) and extending at its inner end into an opening 92 formed in the outer edge of the plate 89, such arrangement serving as an interlock to hold the plate 89 against movement laterally in the opening. 93 indicates a lever pivoted at one end in any desired manner upon a suitable knuckle 94 provided on the housing 77ᵃ or bearing portion 79. The opposite end of the lever 93 is connected by a link 95 with a foot lever 96. 97 indicates a plunger carried by the lever 93 and positioned to engage the outer end of the rod 91. The parts just described are so correlated that when the foot lever 96 is pushed downwardly, the lever 93 will be moved toward the housing 77ᵃ and thru the plunger 97 will move the rod 91 endwise inwardly to slide the plate 89 in the opening 88 endwise and axially of the shaft 80 to cause frictional engagement of the friction clutch members, as already described. The plunger 97 is preferably adjustably fixed to the lever 93 to take up wear between the friction clutch members. For this purpose, the plunger 97 is screw-threaded into an opening formed in the lever 93 and projects beyond the outer face of lever 93 to receive a nut 98 to lock the plunger in its adjusted position. By loosening the nut 98 and rotating the plunger in one directon or the other its inner end can be properly positioned to effect the desired frictional engagement between the friction clutch members. By controlling the downward movement of the foot lever 96, the frictional engagement between the clutch members, and likewise the speed of the shaft 80 relative to the sprocket wheel 78ᵃ, can be regulated, as desired to cause winding of the web A on the drum 2 under any desired tension; or by adjusting the foot lever 96 during the winding operation, the tension on the web for each convolution on the drum can be increased or descreased at the will of the operator. Accordingly, it will be seen in operating the apparatus and carrying out the steps of my process, that for each convolution of the web A wound on the drum or core, the friction between the clutch members may be increased so that the succeeding convolutions will be wound under successively increasing tension. The throw of the lever 93 can also be changed by adjusting the ends of the link 95 so that the pivots therefor engage the openings 95ᵃ, 96ᵃ, formed in the lever 93 and foot lever 96, respectively.

99 indicates as an entirety means for locking the foot lever in different operating positions, to hold the lever 93 and parts associated therewith in the desired position or in the successive positions to which they are operated. Of these means, 100 indicates a plate fixed to the base 1, preferably by screws 101 and provided with a plurality of ratchet teeth 102. 103 indicates a pawl acted upon by a spring 104 to normally hold the pawl 103 in operative relation to the teeth 102. The tail 105 of pawl 103 extends rearwardly into position to be engaged by an arm 106, fixed to a foot plate 107 pivoted on the lever 96.

The foot plate 107 is engaged to push the foot lever downwardly the desired distance. When so operated, the pawl 103 engages a tooth 102 to lock the lever against upward movement. After one or more revolutions of the drum 2, this operation may be repeated, moving the pivot to the next tooth 102. This operation may be repeated until all of the teeth are engaged, or the lever may be moved to its extreme lower position or to any intermediate position and maintained therein throughout the operation of winding each tire casing. To release the pawl, the foot plate 107 is rocked about its pivot in a counter-clockwise direction, which movement rocks the pawl 103 and releases it from the tooth 102, whereupon the lever will swing upwardly and release the clutch members, a spring 108 being provided and acting on the lever 96 to effect this movement.

The power means for driving the driven wheel 78ª preferably comprises the following: 83 indicates the motor (already referred to), preferably of the electric type, fixed to the base 1 and connected by a universal joint 108$^b$ to a shaft 108$^c$. The shaft 108$^c$ is mounted in suitable bearings provided in the front and rear walls of the column 75. 108$^d$ indicates a worm on the shaft 108$^c$ which drives a gear train 108$^e$, which in turn drives a sprocket 108$^f$. 108$^g$ indicates a chain running around the sprocket 108$^f$ and the sprocket 78$^a$ to rotate the latter.

109 indicates as an entirety a mechanism for consolidating the materials $a$, $b$, $c$, $d$, into final fabricated form or condition, thereby ironing out and compressing the helically arranged layers of the materials $c$, $d$, and the folded over portions of the strips $b$ to embed the bead strands $a$ therein, to provide the composite web A, having bead structures along its opposite edges, ready for winding on the drum 2. Of the consolidating mechanism, 110 indicates a frame comprising an arm 111 having upright sections 112. The upper ends of the column 75 and outer frame section 112 are provided with hollow lugs 113, in which are mounted the opposite ends of a connecting bar 114, connected to the lugs 113 by nuts 115. The frame sections 112 are shaped to provide suitable aligned bearings for a plurality of rolls 116, 117, 118, and 119, the associated materials passing first around the roll 116, then between the rolls 116 and 117 and around the latter, then between the rolls 117 and 118 and around the latter and finally between the rolls 118 and 119 and then around the latter roll from which the web A leads to the drum 2. 120 indicates aligned supplemental frames extending laterally from the frames 112 and fashioned to form (1) ways 112$^a$ for a pair of bearings boxes 121 in which is mounted a roller 122 and (2) ways 112$^b$ for a preliminary compressing mechanism indicated as an entirety at 123 which will later be described. As shown in Fig. 1, the roller 122 is mounted to move at right angles to the plane of the rolls 117, 119, and in a plane midway between their axes, so that the roller 122 will simultaneously engage the rolls 117, 119.

The ends of the frames 120 are formed with screw threaded openings for screws 124 carrying hand wheels 125 by means of which they may be rotated to adjust the inner ends of the screws against compression springs 126, the springs 126 bearing against the bearing boxes 121 so that the roller 122 will bear with the desired pressure against the rolls 117 and 119, or the web A as it passes between the rolls 117, 119, and roller 122, so that the latter may compress the tire materials with any desired pressure depending upon the adjustment of the screws 124 to consolidate the associated materials into a unitary, composite web A. In the arrangement just described, I provide but one pressure roller but cause it to co-operate against two rolls so that the material is subjected to two compressing or consolidating operations.

Certain or all of the rolls 116, 117, 118, 119 may be positively driven. In the form of construction shown I have provided a driving means for all these rolls, such means consisting of the following elements: 127 indicates a gear which is driven by a power mechanism 127' to be later described. The gear 127 is mounted on a shaft 127$^a$ carrying a pinion 127$^{a'}$ which meshes with pinions 127$^b$, 127$^c$, fixed to shafts constituting extensions of the shafts for the rolls 117, 119. Between the web engaging roller 117 and the adjacent side of the column 75, the shaft for the roller 117 carries a gear which meshes with a similarly arranged gear on the shaft for the roller 116 and this latter gear meshes with a similarly arranged gear on the shaft for the roller 118 (these latter referred to gears not being shown). As the gears just referred to and the pinions 127$^{a'}$, 127$^b$ and 127$^c$ are of the same size, it will be seen that the rolls 116, 117, 118, 119, will be driven at the same rate of speed.

The preliminary compressing mechanism 123 is preferably arranged between the first roll 116 and the free end of the platen 8. In the arrangement shown for illustrative purposes, the mechanism 123 is positioned relatively close to the free end of the platen 8 so that it may function immediately after the materials $a$, $b$, $c$, $d$, leave the platen to prevent their distortion or relative movement between the associated tire materials or portions thereof, and particularly to prevent any such movement due to the turning of the materials around any one or more of the rolls 116, 117, 118, 119. The preliminary compressing mechanism preferably comprises an idle roll 128, which is mounted in stationary bearings 128$^a$, and an idle roll 129, which is mounted in a pair of bearings 130 slidably fitting a pair of supports 131 and pressed upwardly or toward the bearings 130 by springs 132. The supports 131 are shaped to slidably fit the ways 112$^b$, whereby the rolls 128, 129, can be adjusted into any desired position relative to the free end of the platen 8. Each of the rolls 128, 129, is preferably formed of soft rubber and the central portion thereof between those portions engaged by the bead structures of the web is covered with one or more turns of muslin or other suitable material to make such central portion somewhat softer than the end portions engaged by the bead structures. The supports 131 are fixed to the frames 120 by suitable set screws.

Of the power mechanism 127', 133 indicates a gear mounted on a stud shaft carried by one inner wall of the column 75 and meshing with the gear 127. 134 indicates a pinion fixed to a shaft 135 also carried by the walls of the column 75 and meshing with the gear 133. The shaft 135 carries a bevel gear which is driven by a bevel pinion 136. The pinion is fixed to a shaft 137 carrying a sprocket 138, which in turn is engaged by a chain 139. The chain 139 in turn engages a sprocket 140 on one end of a countershaft 141. The shaft 141 is mounted in the frame base 1 and carries at its opposite end a sprocket (not shown). 142 indicates a chain running around the last mentioned sprocket and a sprocket 143 fixed to the shaft 36ᶜ. From the foregoing description it will be seen that the driving of the consolidating rolls and rotation of the shuttle is effected from the motor 38, this arrangement providing for simultaneous starting and stopping of these driven elements so that all portions of the materials will all be acted on when the machine is started in operation and their feeding stopped when the power is shut off.

144 indicates a guide means for the web A for supporting it at points beyond the consolidating mechanism 109 and for guiding it onto the periphery of the drum 2. The guide means 144 preferably comprise one or more arms 145 pivoted on lugs 146 formed integrally with the arm 111 and a shoe 147 carried by the outer ends of the arms 145 and adapted to ride on the drum 2 as it rotates. The shoe may consist of a plurality of parallel bars 148 carrying pairs of bearings for rollers 149, and over which the web A runs, to reduce the friction thereon.

The shoe frame and the rollers thereon are so arranged that the web will be guided to the drum in a substantially tangential direction. 150 indicates an idle roller mounted at its opposite ends on the arms 145 rearward of the shoe 147 and co-operating therewith to support the web A as it is fed from the consolidating mechanism 109.

The surface or periphery of the drum 2 may be of any desired shape depending upon the nature of the steps or mechanism employed in completing the casing or in shaping it into its final form ready for use.

Where the tire casing is to be removed from the drum and its body portion expanded circumferentially, I prefer to shape the drum as shown in Figs. 7 and 8. In this form of construction, the central portion of the drum is flat, as shown at 2ᵃ and the opposite side edges of the drum have inwardly or downward inclined walls 2ᵇ, forming seats for the bead structures, this arrangement permitting the bead structures to be so positioned that the upper face of the bead structure for the last convolution of the web wound on the drum will be substantially in the plane of such convolution and thereby enable the tread B to be easily applied in position thereon.

In the operation of the machine, the materials are supplied from the spools 10, arbors 25 and spool 51, the latter revolving as already described, and serving to wrap or wind the cords $c$ or cords $c$ and sheet material $d$ helically about the spaced strands $a$, such winding serving to fold the over-lying portions of the strips $b$, as the latter move beyond the free ends of the guides 27, 28, around or over the strands $a$ embed them therein. This operation is partly shown in Fig. 5 at the left side of the platen 8. Due to the feeding of the strands $a$, and strips $b$ longitudinally of the platen and rotation of the shuttle, the materials are properly associated before being supplied to the consolidating mechanism. This latter mechanism, as already described, then operates to compress or consolidate the materials under pressure into a fixed relation, thereby producing a single composite web A, from which the casings are made.

In forming a casing, the free end of the web A is first connected to the drum 2. This step is preferably accomplished by connecting each bead structure to the drum 2 by a pair of clamping devices 151, each device comprising a clamping element 151ᵃ and a threaded shank 151ᵇ, fitting a threaded opening formed in a lug extending laterally from the edge of the drum. For well known reasons, the end of the web is preferably cut at an acute angle to one of its sides, so that one clamping device 151 is positioned at a different point angularly on the drum relative to the other device, for which reason only one clamping device appears in certain of the figures. Next the foot pedal 96 is operated to cause engagement of the friction clutch members, which in turn effect rotation of the shaft 80, chuck 81 and drum 2. This latter operation is continued until the desired number of plies or convolutions of the web A are wound on the drum 2; then the web is severed transversely, that is, at an angle as above described, and the end secured to the wound convolutions in any desired manner, such securing operation including the connection of the ends of the bead structures to the wound bead structures. Next, strips of material are wound on the opposite edges of the bead structures as shown at $f$ in Fig. 8, the strips $f$ extending down the edges of the bead structures and their free edges engaging the drum, so that when the casing is removed, such edges may be folded around against the inner side of the inner convolution. As will be understood the strips $f$ serve to enclose the bead structures in the finished product. The strips $f$ may be supplied from spools mounted at some convenient point on the frame of the machine and applied in position while the drum is being rotated, either by the motor 83 or by hand.

If during the winding operation just described, for example, at the end of each convolution of the web as the winding proceeds, it is desired to increase the tension on the web A to give the outer ply or plies greater tension in the resulting product than the inner ply or plies, the operator pushes the pedal downwardly a greater distance one or more times, the effect of which is to increase the friction between the clutch members and hence prevent less slippage between them, so that greater pull or tension is exerted on the web A as it feeds from the consolidating mechanism. Next, the casing is removed from the drum 2, or the drum 2 may first be disassembled from the chuck (this latter operation being preferable), and the strips $f$ are folded around the bead structures, as already described, and then the casing is manipulated by any desired means, to expand its body portion and move the bead structures toward each other to form the casing into the desired cross sectional shape ready for use as a tire.

To provide for the ready removal of the wound casing from the drum 2, the latter comprises a plurality of curved sections 152, 153, 154, hinged to each other, one being detachably connected to the adjacent section, whereby the drum may be collapsed, as shown in dotted lines in Fig. 7. Each section of the drum is provided with a pair of knuckles at one end and a single knuckle at its opposite end, the latter fitting between the pair of knuckles on the adjoining end of the next section and connected thereto by a pivot 155. The pivot for the aligned knuckles between the sections 152 and 154 is removable for the purpose above described, whereby the section 154 may be swung inwardly about its other pivot to permit of the collapsing operation. The adjoining ends of the sections 152, 154, are preferably provided with abutting walls $152^a$, $154^a$, respectively, which limit the outward movement of the latter section when the drum 2 is to be expanded into position to be assembled on the chuck 81.

156 indicates a device for rolling down the web A as it winds on the drum 2, such device preferably acting in a radial direction toward the axis of the drum. The device 156 preferably comprises a roller suitably mounted to rotate in an adjustable or movable frame 157 and arranged to be pressed against the convolutions of the web A as the drum 2 revolves, thereby rolling each convolution flat against the drum or the convolution previously applied thereto. The roller 156 is preferably mounted to engage the drum 2 on its inner side, this arrangement permitting the roller to be slidably mounted in a simple manner on the adjacent side wall of the column 75. The frame 157 comprises a slide member $157^a$ having a laterally extending bracket 158 carrying at its outer end an inturned arm 159. The arm 159 is provided with a suitable bearing 160, which aligns with a bearing on the slide member $157^a$ to support the opposite ends of the roller shaft 161. 162 indicates a pair of guides rigidly connected by cross bars 163 and provided with flanges 164 which are bolted to the column 75, as shown in Fig. 1, the guides being shaped to provide ways for the slide member $157^a$. The frame 157 may be moved toward and away from the drum 2 by any suitable means, that shown for illustrative purposes comprising compressed air operating mechanism indicated as an entirety at 165.

Of this operating mechanism, 166 indicates a bracket fixed to the column 75 and forming with the latter a support for trunnions 167 extending from the opposite sides of a cylinder 168. The cylinder encloses a piston, connected by a rod 169 with a link 170. The upper end of the link 170 is pivotally connected with the slide member $157^a$; the lower end of the link has a pivotal slidable connection by means of a screw 171 mounted on the side wall of the base 1 and an elongated slot 172 formed in the link 170, such slot permitting the rod to move endwise due to its movement about the screw 171 as a pivot. The air or other fluid used for operating the piston in the cylinder 168 in either direction may be controlled by a hand-operated valve 173, preferably mounted on the frame 111.

As already described, I have provided two electric motors 38, 83, the former for driving the shuttle ring member 31 and rolls of the consolidating mechanism and the other for driving the chuck 81. These motors may be controlled by any suitable mechanism, but in the preferred form such mechanism may consist of magnetically controlled switches mounted in a housing 174 and actuated by push buttons 175 for the motors 38, 83, respectively and a push button 177 arranged to stop both motors simultaneously.

When it is found desirable to reverse the operation of assembling or connecting the tread B to the casing, I provide a drum 2' (see Fig. 13) in the periphery of which is formed a groove 178 of a size and shape to exactly receive and hold a section of the tread in inverted position, that is, with that side which is to engage the road when the tread and casing are complete and in operation, against the drum 2'. In this construction, the exposed surface of the tread lies flush with the side portion of the drum periphery. In making up a casing with this form of apparatus, a section of tread B' having a length equal to the circumference of the drum is placed in the groove 178 with its opposite ends brought together; next the strips $f$ are applied so that they may be folded over the bead structures; then the web A is connected to the drum and the latter rotated in the manner already described to wind one or more plies of the web on the tread B′, strips f and drum; then the wound web and tread are removed from the drum, and the strips f are folded in position; then the wound web and tread are reversed, so that the tread B′ is arranged on the outer side of the casing; and finally the casing and tread are expanded into the desired cross sectional shape by any desired or well known means.

As any suitable mechanism may be employed to effect expansion of the body portion of the casing and tread and movement of the opposite side edges inwardly to form the casing into its final shape, I have not thought it necessary to illustrate the same.

However, when it is desired to complete the shaping of the casing into its final form upon the drum, I may carry out my process as follows, reference being had to Figs. 15, 16, and 17; first I mount on the drum 2″ a deflated tube 179; I then proceed in the manner already described to wind the desired number of convolutions of the web A on the tube and drum, as shown in Fig. 15. In carrying out these steps of my process, the tube 179 is arranged centrally between the side edges of the drum 2″ or centrally of the bead structures of the web A and I preferably also provide on the drum 2″ at either side of the tube suitable filling material 180 to occupy the space between the latter and the bead structures. Next, I inflate the tube by a fluid supplied from some suitable source and simultaneously, by mechanism not shown, move the opposite side edges of the casing inwardly as shown in Fig. 16, which operations are continued until the casing is shaped into final form in cross section as shown in Figure 17.

The fluid for inflating the tube 179 may consist of air supplied from the same source as that which supplies air to the cylinder 168 and leading from such source through a suitable pipe to a valve stem (not shown) for the tube 179. The pipe is detachably connected to the valve stem when the tube is to be inflated. The valve stem is connected in a well known manner to the tube (for example, like that for an ordinary inner tube for a tire) and may extend thru an opening formed in the drum.

In Figs. 15, 16 and 17 it will be understood that the outer convolutions of the bead structures are wound slightly over-size to provide for their proper positioning in the final formation of the casing. When it is desired to wind the bead structures under substantially uniform tension or the outer ones under tension greater than the inner ones, I provide the tube with a spacing element 181 which is shaped to form spaced rounded walls or guides 182 so that in winding the web A in the manner already described, the bead structures may be positioned on the drum periphery side by side beyond the guides 182, the innermost bead structures being disposed thereagainst. In this form of construction I may use clamping devices as indicated as an entirety at 183. Each of these devices comprises a pair of hinged arms 184 and a screw 185 arranged to engage one of the arms to cause a clamping of the bead structure between them. The screw 185 is mounted in a screw threaded opening formed in a lug 186 provided on the edge of the drum and is preferably operated by a handle 187. The hinged arms removably fit into an opening 188 formed in the periphery of the drum, which opening is so arranged that the inner end of the screw 185 extends into it. As shown in Fig. 18, the arms are positioned in the opening 188 with their free ends disposed on opposite sides of the bead structure and the arms abutting the wall of the opening and the inner end of the screw. If now the latter is operated to thrust its inner end inwardly, a clamping action of the bead structure will be effected and thus secure the latter to the drum. Fig. 18 shows the web wound on the drum and spacing element with the bead structures at either side thereof. Following these operations, the clamping devices 183 are removed, the tube inflated and the bead structures moved inwardly to form the casing into final form as shown in Fig. 19.

Fig. 20 shows a drum shaped to wind a casing with the bead structures under the same tension as described in connection with Figs. 18 and 19, but wound directly on the drum as shown in Figs. 1 and 8. In this latter form of construction, the casing is removed from the drum before being subjected to the necessary steps for shaping it into final form.

From the foregoing description it will be seen that the composite web A is continuously fabricated from the tire materials and bead materials supplied from the spools and arbors referred to, so that the web is of indefinite length. Accordingly, it will be seen that the end of the web or the beads thereof may be attached to the drum and the latter rotated any desired number of times to wind the web convolutely thereon as one continuous piece or section so that the web section is continuous from end to end irrespective of the number of plies thereof that is applied to the drum. It will also be seen that each of the cords incorporated into the composite web is continuous from end to end and unbroken throughout the entire length or section of the web when the latter is wound into the final form on the drum.

To those skilled in the art to which my invention relates, many alterations in the construction and widely differing embodiments and application of my invention will suggest themselves without departing from the spirit and scope thereof. My disclosures and the description herein are purely illustrative and are not intended to be in any sense limiting.

What I claim is:

1. The herein disclosed process which consists in feeding under tension to a drum a composite web of tire materials to form a convolutely wound band, then in connecting the end of the web to the drum, then in rotating the drum a predetermined number of times to wind said web convolutely on its surface and increasing the speed of rotation of the drum at the end of a predetermined number of revolutions thereof, and finally in severing the web.

2. The herein disclosed process which consists in feeding under tension to a drum a composite web containing all of the materials entering into a tire carcass including beads incorporated in its side edges, then in connecting the end of the beads to the drum, then in rotating the drum a predetermined number of times to wind said web convolutely on its surface and increasing the speed of rotation of the drum at the end of predetermined revolutions thereof, and finally in severing the web.

3. The herein disclosed process which consists in feeding to a drum a composite web containing all of the materials entering into a tire carcass including the beads incorporated in its side edges, then in connecting the end of the beads to the drum, then in rotating the drum a predetermined number of times to wind said web convolutely on its surface and increasing the speed of rotation of the drum at the end of each revolution, and finally in severing the web.

4. In a machine of the class described, the combination of a frame, a platen thereon, said platen including a pair of movable side sections, means for associating tire materials around said platen to form a web flat in cross section, and means for adjusting said side sections toward and from each other.

5. In a machine of the class described, the combination of a frame, a platen thereon, said platen comprising movable intermediate and side sections, having inclined abutting edges whereby movement of the intermediate section adjusts the spaced relationship of the side sections, and means for feeding to and associating tire materials around said platen.

6. In a machine of the class described, the combination of a frame, a drum rotatably mounted on said frame, means for feeding a composite web of tire materials to said drum, a guide correlated with said feeding means and disposed substantially tangentially to said drum, means for securing the free end of the web to said drum, and means for rotating the drum to convolutely wind the web thereon.

7. In a machine of the class described, the combination of a frame, a drum rotatably mounted on said frame, means for feeding a composite web of tire materials to said drum, a guide pivoted to said frame and disposed substantially tangentially to said drum for guiding the web thereto, means for securing the free end of the web to said drum, and means for rotating the drum to convolutely wind the web thereon.

8. In a machine of the class described, the combination of a frame, a drum rotatably mounted on said frame, an inflatable tube disposed circumferentially of said drum midway between its sides, supporting and spacing strips disposed circumferentially on said drum along the opposite edges of said tube, means for feeding to said drum, tube and strips a composite web of materials in superposed relation thereto, means for rotating the drum, whereby said web is convolutely wound thereon in superposed relation to said tube and strips, and means for inflating said tube.

In testimony whereof, I have hereunto subscribed my name.

HOWARD I. MORRIS.